United States Patent [19]

Barnes et al.

[11] Patent Number: 4,655,295

[45] Date of Patent: Apr. 7, 1987

[54] TRACTOR AND IMPLEMENT STABILIZER

[75] Inventors: Billy R. Barnes, Lamesa; Ronny L. Barnes, O'Donnell, both of Tex.; David A. Gary, Box 449, O'Donnell, Tex. 79351

[73] Assignees: Ronny R. Barnes; David A. Gary, both of O'Donnell, Tex.

[21] Appl. No.: 754,619

[22] Filed: Jul. 12, 1985

[51] Int. Cl.⁴ .................... A01B 59/041; A01B 49/02; A01B 69/00

[52] U.S. Cl. ..................... 172/26; 172/191; 172/443; 172/450; 172/677; 180/131

[58] Field of Search ............... 172/23, 26, 190, 191, 172/134, 245, 250, 253, 310, 443, 502, 619, 649, 650, 657, 676, 677, 439, 449, 450; 111/83; 180/79, 131; 104/244.1; 280/415 R, 411 A, 638, 639, 411 C, 656, 476 A, 476 R

[56] References Cited

U.S. PATENT DOCUMENTS

| | | | |
|---|---|---|---|
| 984,581 | 2/1911 | McCall | 172/677 X |
| 2,019,854 | 11/1935 | Hester | 172/676 X |
| 2,197,670 | 4/1940 | Theis | 104/244.1 |
| 2,496,760 | 2/1950 | Watson | 172/190 |
| 2,713,295 | 7/1955 | Silver et al. | 172/502 X |
| 2,752,838 | 7/1956 | Rudio | 172/502 X |
| 2,797,627 | 7/1957 | Anderson | 172/677 |
| 3,021,621 | 2/1962 | Needham | 172/502 X |
| 4,069,874 | 1/1978 | Buck et al. | 172/450 |
| 4,117,889 | 10/1978 | Larson | 172/450 X |
| 4,142,588 | 3/1979 | Doss | 172/190 |
| 4,331,345 | 5/1982 | Williams | 172/677 X |

FOREIGN PATENT DOCUMENTS

1098133 7/1955 France ................. 172/677

Primary Examiner—Richard T. Stouffer
Assistant Examiner—Terrence L. B. Brown
Attorney, Agent, or Firm—Wendell Coffee; Montgomery W. Smith

[57] ABSTRACT

A large coulter is laterally rigidly connected to a tractor. The coulter prevents lateral shifts and jerks of the tractor, thereby eliminating the tractor as a source of lateral shifts of drafted earthworking equipment. When also laterally rigidly connected to the drafted implement, the coulter practically eliminates lateral shifts of the implement as well. On a first pass, such as when plowing furrows to form beds for row crops, the coulter cuts a slot in the ground. During subsequent passes, driving the tractor over the same pairs of furrows, the coulter tracks this slot, causing the drafted earthworking implement to follow a path matching that of the implements used on the first pass. A draft member and the coulter frame also connect the drafting force exerted by the implement at a point on the tractor forward of the tractor rear axles, thus enhancing draft capabilities and fuel efficiency of the tractor while retaining the conventional rear hitch, and stabilizing the tractor as described above.

3 Claims, 15 Drawing Figures

TRACTOR AND IMPLEMENT STABILIZER

BACKGROUND OF THE INVENTION

1. Field of the Invention

This invention relates to agricultural earthworking methods and equipment. Applicants designate one with ordinary skill in the art to be a farmer, agricultural engineer, or a person having experience in the construction and operation of agricultural earthworking equipment.

2. Description of the Prior Art

Farmers have always had difficulty plowing a straight furrow. Surface undulations, rocks, clods, clumps of weeds, grass and roots, steering corrections, and other causes of lateral shifts, jumps, jerks, wiggles or waggles of the earthworking implements can not be accounted for with prior art equipment.

One prior art solution has been to attach a coulter or disc to the earthworking tools or implements to minimize sudden lateral shifts. The use of such coulters attached to drafted implements helped somewhat in obtaining "acceptably straight" furrows or plowing, for that technology. However, even the "acceptable" lateral deflections or wiggles permitted by the prior art caused problems.

Those skilled in the art will be aware of the small "wiggles" or "crooks" in furrows and beds plowed by even the most expert farmer using the best prior art equipment. The wiggles or crooks of the beds, when combined with lateral wiggles of the planters, frequently result in crops being sown off-centered on the beds, or even on the side of the beds in the furrows. Later, when the crops have sprouted, mechanical treatment for weeds, such as with sweeps, requires that the individual sweeps be run at a generous clearance from the bed centers to avoid damaging off-centered crop plants, and to allow for wiggles or lateral swings of the sweeps.

Early self-powered agricultural tractors mounted earthworking implements underslung below the tractor, forward of the tractor rear. Development of the art since those early devices has resulted in more powerful tractors, with earthworking implements hitched at the tractor rear. The rear hitch tends to lift the front wheels of the tractor off the ground during heavy drafting. Those skilled in the art will recall the counterweights commonly used at the tractor front to counteract this tendency.

Before this application was filed, a search was made in the U.S. Patent and Trademark Office. That search developed the following patents:

PLUM U.S. Pat. No. 1,608,666
ALTGELT U.S. Pat. No. 2,637,262
STEFFE U.S. Pat. No. 3,601,202
CAPEHART U.S. Pat. No. 3,840,076
QUANBECK U.S. Pat. No. 4,068,723

These patents are disclosed because such references, developed by an experienced searcher, might be considered relevant and pertinent to the examination of this application.

SUMMARY OF THE INVENTION

1. New Function and Surprising Results

We have made the following observations incident to developing our invention. Tractor manufacturers, and those designing agricultural implements, tend to provide for relatively loose connections of drafted implements to the draft vehicle or tractor. The common three-point rear hitch typically has ball joints therein to accommodate lateral or side-to-side swings of the drafted implement at the ends of the three-point hitch members.

The large pneumatic tires commonly used on farm tractors are frequently wider than the furrows in which they must run, which causes the tires to climb the sides of the beds, and introduces a rocking or fishtailing motion of the drafted implement. The large amount of sidewall flex of the pneumatic tires allows the tractor to shift laterally, while the tires remain in a fixed position. Radial ply tires exacerbate this lateral shifting.

We have discovered that the major causes of the problems described above are that (1) the tractor is allowed to move laterally and (2) the connection of the cultivating equipment to the tractor is not laterally rigid.

The terms "laterally rigidly connected" or "laterally rigid" will be understood to describe an absence of and the prevention of relative side to side or substantially horizontal movement transverse of the direction of draft.

We have discovered a way to prevent lateral movements of the tractor and earthworking implement by laterally rigidly connecting the tractor to a coulter run deep within the earth along the direction of draft. A laterally rigid interconnecting coulter frame prevents lateral movement of the tractor with respect to the coulter.

The flat side surfaces of the coulter disc, revolving parallel to the direction of draft, bear against the earth in which the coulter runs, and with the laterally rigid connection of the frame, prevent lateral movement of the tractor with respect to the coulter. Because the tractor is laterally fixed, the earthworking implement drafted behind the tractor is more stable. This produces the unexpected result that any coulters on the implement work more efficiently to stabilize the earthworking devices on the implement, because lateral movement of the implement is not being caused by shifts of the tractor transmitted through the hitch.

However, the loose connections of the implement at the hitch still permit substantial unacceptable, lateral movement of the implement with respect to the tractor and coulter. We also prefer to laterally rigidly connect the implement to the coulter frame so that the tractor, coulter, and implement are all rigidly laterally connected. Lateral movement of both the implement and the tractor with respect to the coulter are thus prevented. This causes the tools of the drafted implement to track paths parallel to the straight groove cut by the stabilizer coulter.

Moreover, we have discovered that our invention produces another surprising and very beneficial result. Because our coulter is run deep, it cuts a draft groove in the packed soil below the rear tractor wheels on the first pass over the ground. During subsequent passes, the coulter is preferably positioned to engage the previously cut draft groove. In fact, experimental runs have demonstrated that the coulter will tend to fall or run into the draft groove and remain there even if not precisely positioned at the start of a run or pass.

Thus, as the earthworking implement is drafted behind the tractor on runs after the first pass to create rows or beds, the tractor wheels pack the soil further, and the coulter will follow the draft groove or slot, and the earthworking devices attached to the earthworking implement will follow a desired path relative to the path of the previous pass of the tractor and earthworking implement. Thus, even if slight fluctuations or lateral deviations from a perfectly straight row are introduced by steering corrections, those deviations will be followed by the coulter in the draft groove, and followed by the earthworking devices along the rows or beds.

The tractor stabilizer is well adapted to plowing contoured beds that are curved to conform to the contours of the land. In this case it is extremely difficult to accurately track the bends and curves of the beds on subsequent passes after the first run, such as with a planter. However, with our invention, this is made a very simple task. Since the draft groove will be followed on the planting pass by the stabilizer coulter, the seed will be sown in the middle of the contoured beds. Thus, the term "straight path" means, in addition to a ruler straight line, a path conforming to a desired curvature for contour plowing, without the crooks or wiggles in the path that typify prior art farming practice.

After the crops have sprouted it may be necessary to mechanically treat weeds with sweeps or the like. Our invention permits the placement of the sweeps at a much closer proximity to the growing plants than was heretofore possible. The stabilizer coulter will follow the draft groove, and the sweeps on the drafted implement will follow the preset path and maintain the close preselected clearance from the plants sown in the center of the beds along the path set by the first pass.

Similarly, during all agricultural activities, including harvesting and even shredding of stubble remaining after harvesting, the tractor stabilizer of our invention may be used advantageously to cause row-type tools or devices on drafted equipment to follow a desired path along the rows.

Our invention also uses the coulter frame to transfer the draft load from the rear of the tractor to forward of the rear axle. We have discovered that it is beneficial to ignore the direction taken by the prior art in connection with rear drafted implements, and to transfer this load on the tractor from the rear to a connection point forward of the rear axle. Draft members connect the coulter frame to the tractor, along the direction of draft, and the coulter frame is preferably connected to the implement. The drafting forces resulting from the drafted implement are exerted, through the draft members and coulter frame, on the tractor frame forward of the rear axle. The front wheels are forced more firmly on the ground, instead of being lifted from the ground, during heavy drafting, and weight is removed from the rear wheels, reducing undesirable packing of soil and reducing the drive load.

Thus, our invention provides for heavier drafting loads using smaller, more fuel efficient tractors, while the prior art teaches overcoming the draft loads with more power and fuel, and heavier tractors. Those skilled in the art are familiar with the current trend toward large, four-wheel drive tractors for large farming applications.

Thus, it may be seen that the total function of our invention far exceeds the sum of the functions of the individual parts such as coulters, hubs, axles, tubing, etc.

2. Objects of this Invention

An object of this invention is the drafting of implements along a substantially straight path.

Another object of this invention is to retrace a first path of an earthworking implement on subsequent passes.

Still another object of this invention is to transfer a draft load exerted along the direction of draft from the rear hitch of the tractor to forward of the rear axles.

Further objects are to achieve the above with a device that is sturdy, compact, durable, lightweight, simple, safe, efficient, versatile, ecologically compatible, energy conserving, and reliable, yet inexpensive and easy to manufacture, attach, adjust, operate and maintain.

Other objects are to achieve the above with a method that is versatile, ecologically compatible, energy conserving, rapid, efficient, and inexpensive, and does not require skilled people to attach, adjust, operate, and maintain.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENTS

Figure 3:
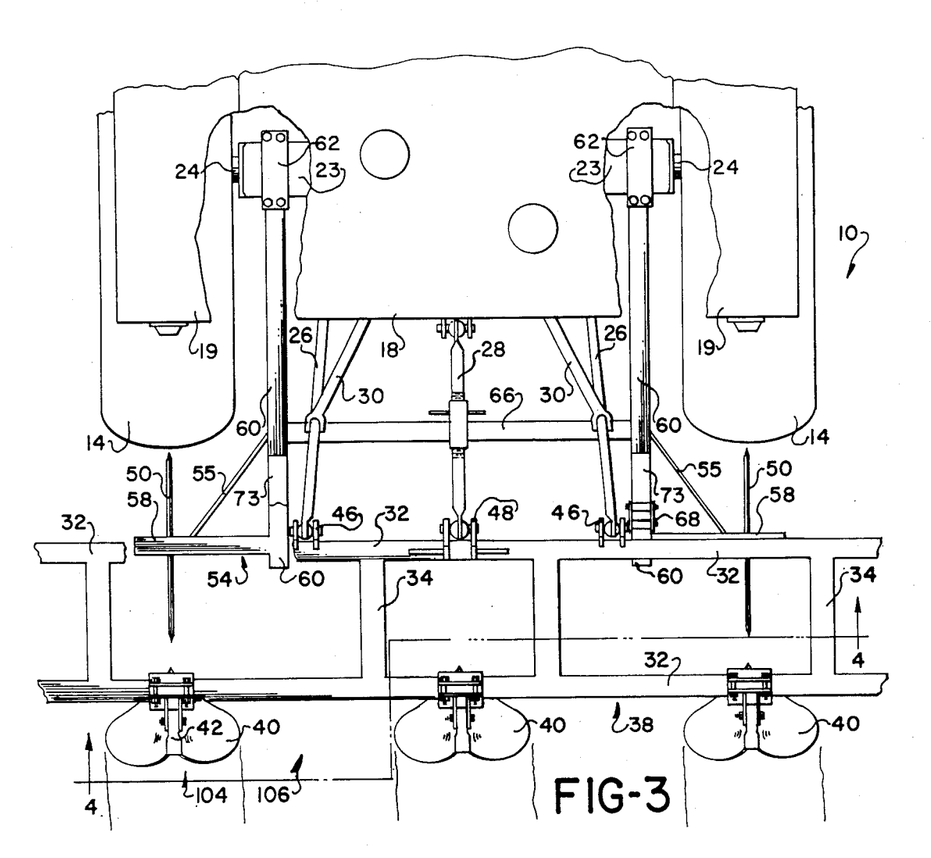
FIG. 3 is a partially broken away top plan view of the embodiment shown in FIG. 1.
Figure 4:
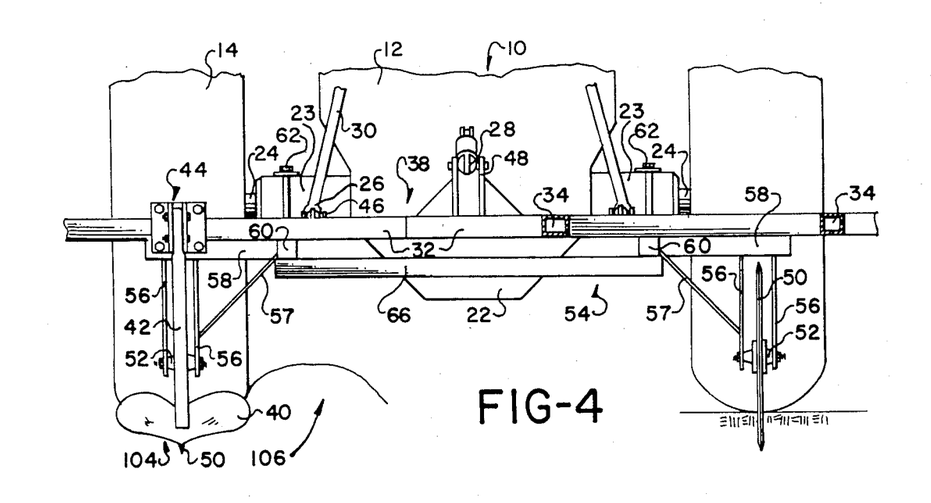
FIG. 4 is a section view taken substantially along line 4—4 of FIG. 3.
Figure 13:
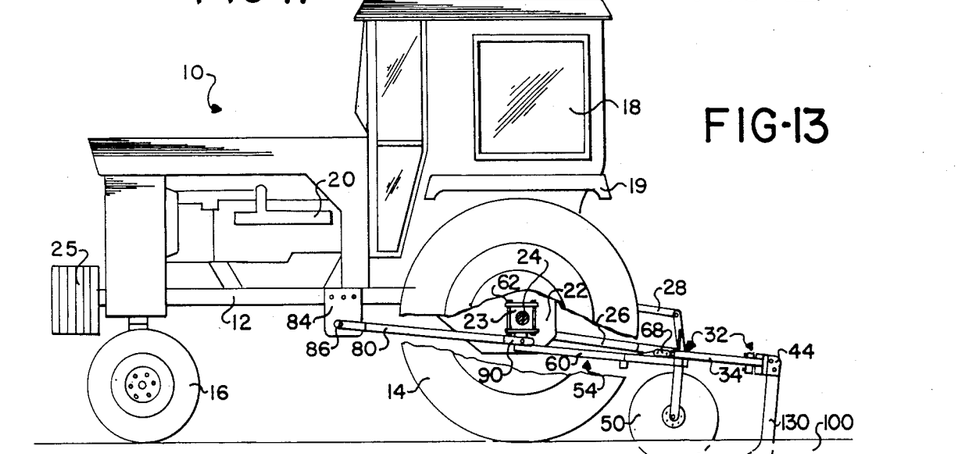
FIG. 13 is a side elevation view with portions broken away to show detail of the draft transfer structure of our invention.

A draft vehicle in the form of tractor 10 traverses ground or earth along a direction of draft. Referring to FIGS. 3, 4, and 13, the tractor 10 includes frame or chassis 12, rear wheels 14, front wheels 16, cab 18, fenders 19, motor 20, and transmission housing 22. Rear axles 24 extend from axle housings 23 on each side of the transmission housing 22 to the rear wheels 14. Lower hitch arms 26 and upper hitch link 28 are a standard three-poit rear hitch common to most tractors. Hydraulically operated lift arms 30 of the tractor 10 raise and lower the lower hitch arms 26. The above structure is typical of a medium size, medium duty tractor commonly used in agriculture. Some tractors, such as the large, heavy, four-wheel drive type, may differ somewhat, but will have similar hitch arrangements and large rear drive wheels. Thus, our invention is applicable to almost all agricultural draft vehicles. Weights 25, as well known in the art, are mounted on the front of the tractor 10 to counter the tendency of the front wheels to be raised from the ground when heavy drafted loads are placed upon the tractor 10 rear hitch.

An earthworking implement drafted behind the tractor 10 ordinarily includes a base frame 38 in the form of parallel tool bars 32 connected by cross members 34. Earthworking tools or devices, such as moldboard plows 40, depend from shanks 42 clamped by clamps 44 to the tool bars 32. The earthworking implement thus includes the frame 38 and earthworking tools or devices.

The base frame 38 has lower hitch points 46 and upper hitch point 48 corresponding to the lower hitch arms 26 and the upper hitch link 28, providing for connection of the earthworking implement to the draft vehicle. The operation of the hydraulic lift arms 30 will therefore lift and lower the earthworking implement at the tractor rear.

All of the structure described above, and variations thereof, is well known in the art. The standard connections of the hitch arms 26 and link 28 to the hitch points 46 and 48, respectively, allow for considerable lateral movement of the earthworking implement with respect to the tractor. Manufacturer designs of rear hitches of which we are aware, purposely provide for this lateral looseness with ball and socket type joints.

Figure 1:
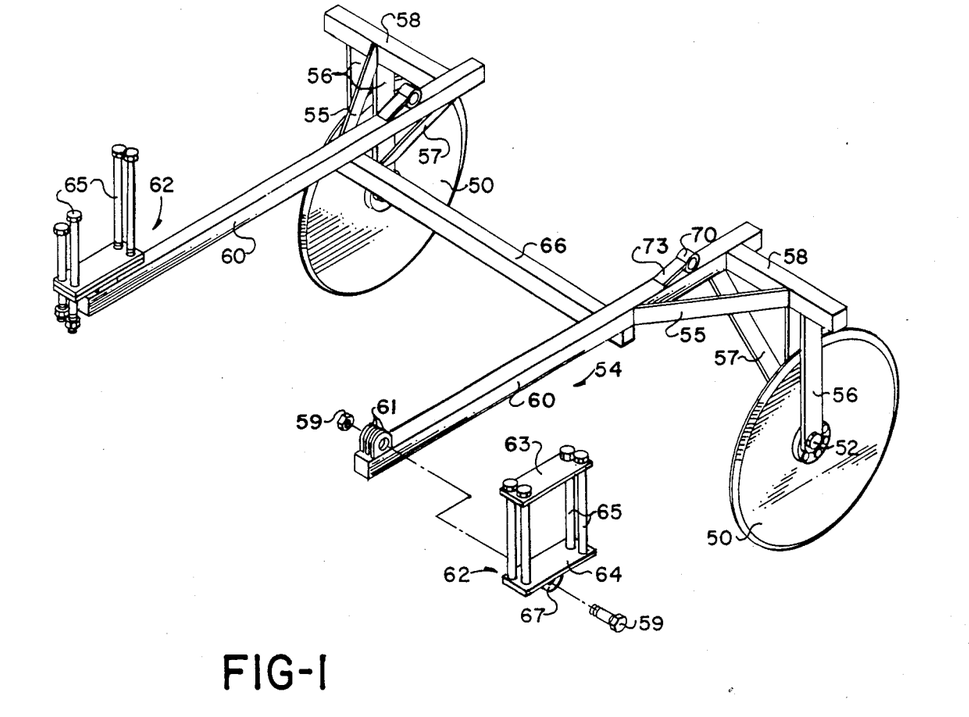
FIG. 1 is a perspective view of one embodiment of our invention.
Figure 2:
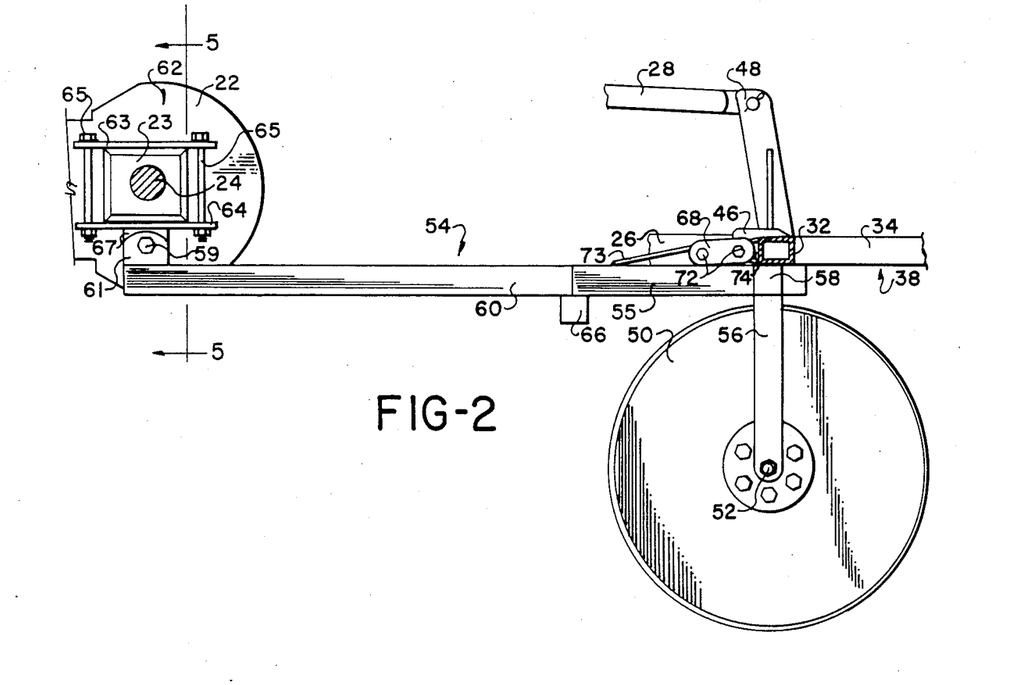
FIG. 2 is a side elevation view of the embodiment shown in FIG. 1, connected to a tractor and an earthworking implement.

To this well-known structure, the preferred embodiment of our invention connects the novel, unique structure described below. Referring to FIGS. 1 and 2, tractor stabilizer coulter 50 is journaled for rotation about coulter axle 52 connected to or extending horizontally through pairs of vertical struts 56 of stabilizer frame 54. The struts 56 depend from horizontal side beams 58, on either side of the coulters 50. The struts 56 are rigidly attached to the beams 58, and are rigidly braced by strut braces 57.

The side beams 58 are rigidly attached normal to horizontal arms 60. The arms 60 are pivotally linked to axle brackets 62, which are fastened about the axle housing 23 extending from the transmission 22. Angle braces 55 extend between the arms 60 and the side beams 58.

Center beam 66 extends between the arms 60 forward of the side beams 58, and laterally rigidly connects the arms 60. Thus constructed, the braced, welded, laterally rigid frame 54 will not permit lateral or side-to-side horizontal movement of the rear axles 24 with respect to the coulters 50 transverse the direction of draft.

As shown in FIGS. 1 through 5, the forward tool bar 32 of the implement preferably rests on the rearward ends of the arms 60 and the side beams 58, thereby exerting the weight of the earthworking implement on the stabilizer frame 54 and forcing the tractor coulters 50 deep into the earth when the hitch is lowered.

Figures 5, 6, 9:
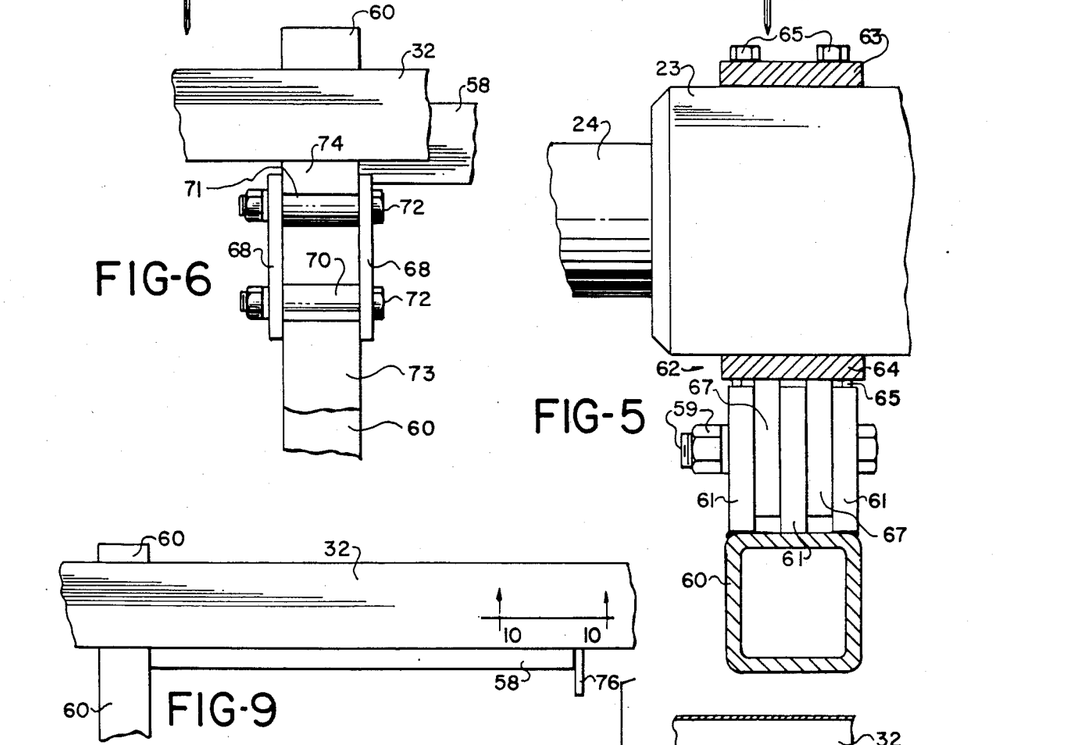
FIG. 5 is a section view taken substantially along line 5—5 of FIG. 2 showing the laterally rigid connection of the frame to the tractor axle houses.
FIG. 6 is a detailed plan view of the pivot connection of the stabilizer frame to the drafted implement as shown in FIGS. 2, and 3.
FIG. 9 is a detailed top plan view of the alternate embodiment shown in FIGS. 7 and 8.
Figure 7:
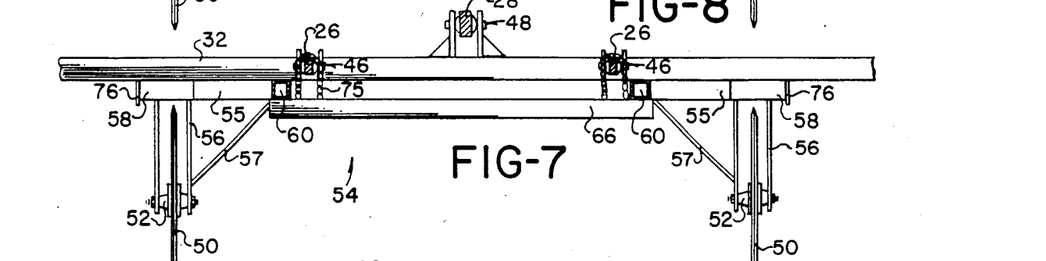
FIG. 7 is a front section view of an alternate laterally rigid connection of the stabilizer frame and the drafted implement.
Figure 8:
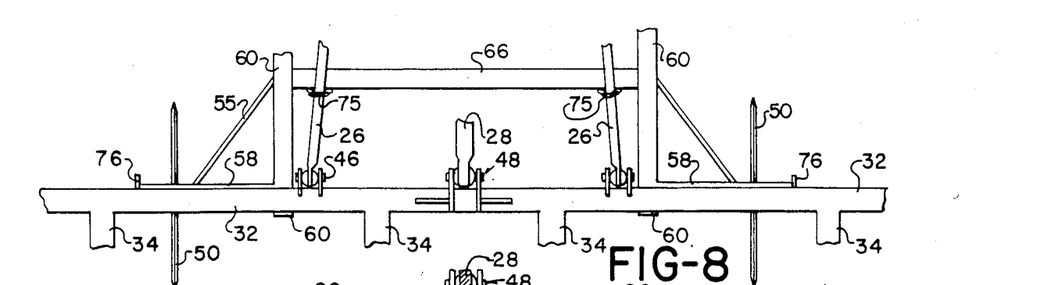
FIG. 8 is a top plan view of the embodiment shown in FIG. 7.
Figure 10:
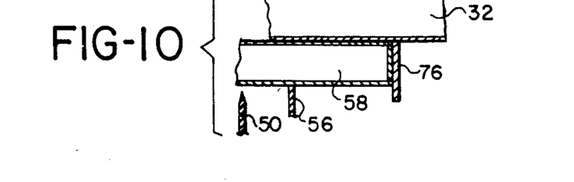
FIG. 10 is a section view taken substantially along line 10—10 of FIG. 9.

Referring to FIG. 5 the axle brackets 62 may each be seen to include upper plate 63 and lower plate 64, connected by plate bolts and nuts 65, about the axle housings 23. Axle lugs 67 depend from the lower plates 64. Arm lugs 61 extend upward from the arms 60 at their forward ends, and mesh with the axle lugs 67. Also see FIGS. 1 and 2. Axle bolts and nuts 59 extend through aligned holes in the meshed lugs 67 and 61. The lugs 61 and 67 are spaced apart, respectively, in close tolerance, such that any lateral movement of the arm with respect to the axle bracket is eliminated.

We prefer to laterally rigidly attach the stabilizer or coulter frame to the earthworking implement with links 68 (FIG. 6) pivotably connecting the arms 60 to one of the tool bars 32. The pivotable connections formed by the links 68 account for shifting of the earthworking implement with respect to the stabilizer frame along the direction of draft while the implement is raised and lowered. A direct connection of the implement and the stabilizer frame would bind during raising and lowering.

The links 68 prevent lateral movement of the implement with respect to the coulters by laterally rigidly attaching the implement to the stabilizer frame as described above. Referring to FIG. 6, arm bushings 70 are rigidly attached to the arms 60 near the side beams 58. Bar bushings 71 are rigidly attached by bar bushing braces 74 to the implement at the forward tool bar 32 in position to parallel the arm bushings 70 when the implement is hitched to the tractor.

Link bolts and nuts 72 extend through aligned holes in the links 68 and the arm bushings 70 and bar bushings 71, to pivotably connect the bushings with the links. The link bolts and the nuts 72 are to be tightened so as to eliminate all lateral slack in the pivoted connection, and form a laterally rigid connection of the stabilizer frame at the arms 60 to the implement at the forward tool bar 32.

Steering stability, and the ability to maintain straight rows, is greatly increased by the use of our invention, since the stabilizer coulters also tend to resist abrupt steering changes. Although our invention greatly increases lateral stability of the tractor and earthworking implement, steering effort is only slightly increased because the front wheels are so far forward of the rear wheels and coulters.

Thus, the increased steering stability does not adversely affect plowing of contoured beds. The typically gentle curves of contoured beds or furrows may be steered with gradual turning of the stabilizer coulter therealong. Indeed, the tractor coulters 50 smoothed curves in a desirable manner during experimental runs.

We have also experimentally run the tractor rear wheels on top of beds. Without the tractor stabilizer of our invention, the rear drive wheels quickly fell off the beds into the furrows. However, with the tractor stabilizer, the rear drive wheels were maintained on top of the beds for any distance desired.

As described above, the coulters 50 cut deep draft grooves or slots 100 on the first pass, which serve as guide or draft slots or grooves or ruts on subsequent passes. The practical benefits of this are illustrated by the example below, also shown in FIGS. 3, 4, 11, and 12.

In FIGS. 3 and 4, earthworking devices in the form of the moldboard plows 40 may be seen to create furrows 104 and raised beds 106. The guide slots 100 extend behind the tractor coulters 50 in the furrow behind each rear wheel 14. As the rear wheels 14 climb over, and are jostled by, imperfections in the soil, or as the wheels 14 try to climb the sides of the beds, and as the plows encounter stones, roots, clods, or other imperfections in the soil, the tractor coulters 50 will prevent lateral movements of the tractor and the earthworking implement. This will result in beds 106 and furrows 104 that are substantially straight, without the jiggles and crooks common to prior art practices.

Figure 11:
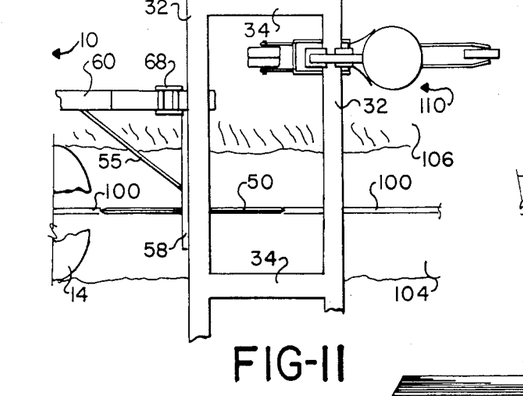
FIG. 11 is a top plan view showing a second pass of a planter along beds plowed with a first pass of the structure substantially shown in FIG. 3.

FIG. 11 illustrates a second pass over the same ground, using a planter, with individual planter units 110 adjusted to the middle of the beds. The tractor stabilizer coulters are positioned to be engaged with the draft grooves 100 by selecting a pair of the furrows previously traversed with the tractor rear wheels, and running the drive wheels in the same furrows. The planter is drafted along the rows, with the stabilizer coulters riding in the draft grooves 100. The coulters 50 in the grooves 100 ensuring that the individual planter units 110 follow the middle of the beds 106, accounting for any steering errors, contoured curves, or other deviations transverse the direction of draft that may have been originally introduced in the rows when the beds were formed on the first pass. Thus, our invention ensures that no matter what path was followed when the beds 106 were formed, the seeds will be sown exactly in the middle of the beds as desired.

Figure 12:
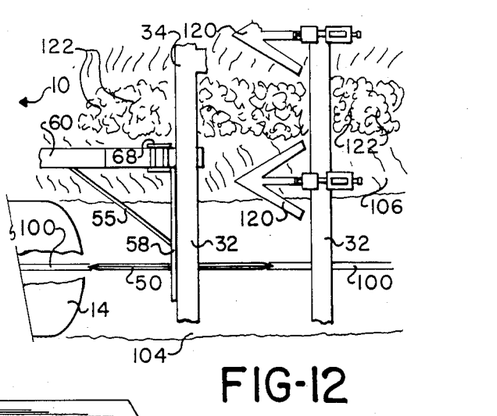
FIG. 12 shows a third pass of a cultivator shown in close proximity to growing crops.

FIG. 12 illustrates a third pass, made with sweeps 120 of a cultivator, another earthworking implement, such as commonly used to clean trash, weeds, and the like from the furrows between growing plants 122. As described above, common practice before our invention was to space the sweeps so that they would have a generous clearance from the growing plants, to account for the typical crookedness of the rows, lateral swings of the implement, and the likelihood that of some growing plants may not be planted in the middle of the beds.

As noted previously, steerability is not substantially decreased, so that if the tractor operator is neglectful, or if he desires, he can still steer the coulters out of the groove and introduce undesired lateral swings of the implement.

When used with our invention, the sweeps 120 may be spaced very close to the growing plants 122, because the coulter stabilizers will ride within the originally cut draft grooves 100, causing the sweeps 120 to follow the desired path just outside and adjacent the growing plants 122. Any crookedness in the rows will be accounted for by the coulter stabilizers tracking the guide or draft slots or grooves 100, and because the coulters 50 and stabilizer frame prevent lateral movement of the tractor and earthworking implement, no lateral swings or jerks or waggles of the sweeps will endanger the plants 122. Thus, much chemical treatment may be abandoned in favor of mechanical treatment, thereby reducing chemical pollution and costs to the farmer.

Although not illustrated in the drawings, it should be apparent that further benefits accrue during other farming activities both before, during, and after harvesting, wherein the paths of previous earthworking implements may be accurately retraced.

FIGS. 7, 8, 9, and 10 show an alternate structure for connection of the stabilizer frame to the earthworking implement, wherein guides 76 extend from the forward tool bar 32 of the implement adjacent and abutted against the ends of the side beams 58, with the tool bar 32 resting on the rearward ends of the arms 60 and the side beams 58. The guides 76 are preferably welded to the tool bar 32. Any lateral movement of the implement with respect to the coulter is prevented by the guides 76, yet slidable movement of the implement with respect to stabilizer frame along the direction of draft, normal to its respective pivot points, is allowed, to avoid binding while the implement is raised and lowered. We prefer to use chains 75 connecting the stabilizer frame 54 at the center beam 66 directly to the lower hitch arms, to lift the stabilizer frame and the coulters in conjunction with lifting the implement.

For the first embodiment shown in FIGS. 1 through 6, the connection of the implement to the hitch is through the links 68, which also couple or hitch the tool bar 32 to the stabilizer frame 38 during drafting. For the embodiment shown in FIGS. 7 through 10, the connection of the stabilizer frame to the hitch is direct, with the chains 75 and guides 76, which structure also does not couple the implement and stabilizer frame together for drafting. Although not shown, the connection of the stabilizer frame to the tractor hitch for up and down movement analogous to the chains 75, could also be by a connecting arm pivoted to each lower hitch arm 26 and to each stabilizer arm 60.

In the configuration shown in FIGS. 1 through 6, the principal drafting force exerted by the tractor on the drafted implement will be at the axle housings 23 through the axle brackets 62, stabilizer frame 54, and links 68. Thus, the stabilizer frame 54 may also be used to transfer drafting forces forward of the rear hitch to the axle housings 23. If the user desires to retain the draft forces on the rear hitch, in the customary manner of the prior art, the slack along the direction of draft at the connection of the frame 54 to the axle housing 23 or to the tool bar 32 should be increased as appropriate to place the draft loads on the rear hitch instead.

In the configuration shown in FIGS. 7 through 10, the drafting force is exerted wholly upon the three-point rear hitch. The weight of the earthworking implement is exerted on the stabilizer frame, and the earthworking implement and stabilizer frame are free to slide forward and rearward with respect to one another responsive to taking up slack in the rear hitch connections.

As described above, we have discovered that it is desirable to transfer draft loads forward of the rear axles. We prefer to use draft bars or arms 80 to transfer the load forward of the tractor rear axles. Each draft arm 80 is pivoted at one end to the stabilizer arms 60 with arm bolts and nuts 82 and at the other end to draft plates 84 by draft bolts and nuts 86.

Figure 14:
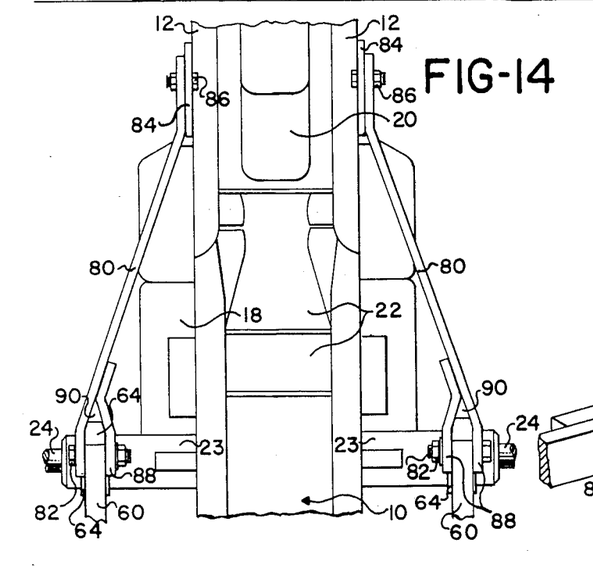
FIG. 14 is a bottom view of the embodiment shown in FIG. 13.
Figure 15:
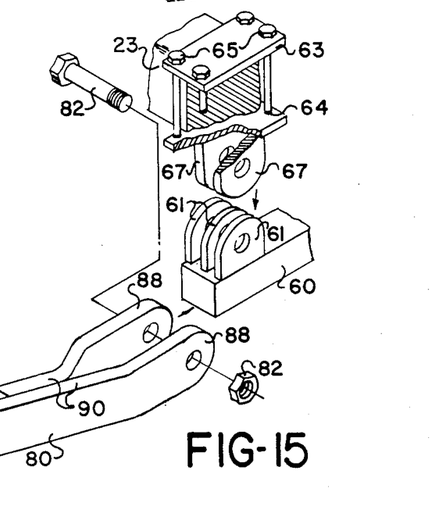
FIG. 15 is a detailed exploded perspective view showing the alternate connection of the stabilizer frame at the tractor axles when used in combination with the draft transfer structure shown in FIGS. 13 and 14.

The pivot connection of the stabilizer arms 60 to the draft arms 80 has less slack along the direction of draft than does the rear hitch connection, so that the draft force exerted on the stabilizer arms 60 by the drafted implement through the links 68 will be exerted on the draft arms 80 instead of on the rear hitch connections. FIG. 15 shows an exploded view of the preferred connection of the draft arms 80 to the stabilizer arms 60. The bolts 82 are longer than the bolts 59, to accommodate ears 88 of yokes 90 at rearward ends of the draft arms 80. As shown in FIGS. 13, 14, and 15, the meshed lugs 61 and 67 are slidably positioned between the ears 88, and the arm bolts extended through aligned holes therethrough. The lugs 61 and 67 and the ears 88 are meshed in close tolerance so that when the bolts and nuts 82 are tightened the entire pivot point assembly of the axle brackets 62, stabilizer arms 60 and draft arms 80 are laterally rigid.

The draft plates 84 are preferably welded or rigidly bolted to the tractor frame or chassis forward of the rear axles on each side of the tractor. The draft bolts and nuts 86 are extended through aligned holes in the draft arms 80 and the draft plates 84 to rigidly fasten the arms 80 to the plates 84. Of course, other suitable draftable connections of the arms and the stabilizer frame could be employed within the scope of our invention. Also, although not shown, by varying the length of the draft arms and their points of connection along the tractor chassis forward of the axles, the load transferred could be varied as desired, although we have found a single point of attachment to work satisfactorily over all draft load ranges tried thus far.

The draft arms 80 transfer some of the draft load to the front wheels, instead of lifting the front wheels off the ground. In the experimental testing and development of our invention, we have discerned that the drafting capacity, fuel efficiency, and stability of the tractor is significantly enhanced by the application and use of the draft arms with the stabilizer frame to transfer the load to the middle of the tractor between the front and rear axles.

We were able to confirm the significant increases in drafting capability of tractors to which our preferred coulter stabilizer and draft arms are connected. During experimental runs without our invention, large rippers, such as rippers 130 shown in FIG. 13, for breaking hard ground were drafted at a lateral spacing of 40 inches apart, and about 10 to 14 inches deep in the ground. The highest gear that could be used during drafting was 3rd gear, while pulling only six (6) ripper units.

In the embodiment of FIGS. 1 through 6, using the same depth and spacing for rippers and the same tractor under the same conditions, and with the coulter stabilizer and draft arms attached, the tractor would pull ten (10) (instead of 6) ripper units in 6th (instead of 3rd) gear. Those skilled in the art will realize that 6th gear is too fast for careful, safe plowing, and will understand why most ripper drafting with our invention attached was done in 5th gear, despite the ability to pull in 6th gear.

We have also noted during our development and experimental use of draft arms and stabilizer coulters the about a twenty-percent (20%) increase in fuel efficiency is realized. Whereas before our invention one tank of fuel would not last a full day, a tank of fuel lasts a full day with the draft arms and stabilizer. These observations were over several days, doing the same work.

Although the test were not scientifically conducted, and may not be exact determinations of increased draft power and fuel efficiency, these observations do suggest that the draft load transfer structure and method of our invention produced substantial increases in drafting efficiency to an extent.

Those with ordinary skill in the art will be familiar with the automatic depth gauge devices attached to the three-point hitches of tractors used for our invention. Such depth gauging devices would regulate the depth of engagement of earthworking implements without the need for gauge wheels on the implements. In our preferred embodiment, of FIGS. 1 through 6 our invention removes the draft load from the three-point hitch and therefore makes such automatic depth control devices inapplicable. Therefore, gauge wheels (not shown in the drawings) are preferably used on the draft implement to regulate the depth of engagement of the earthworking tools thereof.

Despite the unexpected and substantial benefit of being able to retrace the first plowed path and use less power and fuel, as outlined above, significant benefits result from simply being able to remove the sloppiness and lateral movements of earthworking implements.

The embodiment shown and described above is only exemplary. We do not claim to have invented all the parts, elements, or steps described. Various modifications can be made in the construction, material, arrangement, and operation, and still be within the scope of my invention.

The limits of the invention and the bounds of the patent protection are measured by and defined in the following claims. The restrictive description and drawing of the specific example above do not point out what an infringement of this patent would be, but are to enable the reader to make and use the invention.

As an aid to correlating the terms of the claims to the exemplary drawing the following catalog of elements is provided:

10 tractor
12 frame
14 rear wheels
16 front rears
18 cab
19 fenders
20 motor
22 transmission housing
23 axle housings
24 rear axles
25 weights
26 lower hitch arms
28 upper hitch link
30 hydraulic lift arms
32 parallel tool bars
34 cross members
38 base frame
40 moldboard plows
42 shanks
44 clamps
46 lower hitch points
48 upper hitch point
50 stabilizer coulters
52 coulter axles
54 stabilizer frame
55 angle braces
56 struts
57 strut braces
58 side beams
59 axle nuts and bolts
60 stabilizer arms
61 arm lugs
62 axle brackets
63 upper plate
64 lower plate
65 plate bolts and nuts
66 center beam
67 axle lug
68 links
70 arm bushings
71 bar bushings
72 link bolts and nuts
73 arm bushing braces
74 bar bushing braces
75 chains 76 guides
80 draft arms
82 arm bolts and nuts
84 draft plate
86 draft bolts and nuts
88 draft ears
90 draft yokes
100 guide slot
104 furrows
106 beds
110 planter units
120 sweeps
122 growing plants
130 rippers

I claim:
1. Agricultural equipment having
   a. a tractor for moving in a direction of draft with
   b. rear wheels and
   c. front wheels,
   d. a tractor frame connecting the front wheels to the rear wheels,
   e. large low pressure pneumatic tires on the rear wheels,
   f. rear axles having the rear wheels thereon extending from
   g. axle housings extending from
   h. a transmission housing,
   j. a standard three-point rear hitch attached to the transmission housing including
      i. lower hitch arms,
      ii. upper hitch link and
      iii. hydraulically operated lift arms from the tractor to the lower hitch arms;
   k. an implement frame attached to the three-point hitch, and
   l. agricultural tillage implements on the implement frame;
   wherein the improvement comprises:
   m. a rigid stabilizer frame including
   n. stabilizer arms pivoted to the axle housings by
   o. horizontal bolts so as to prevent lateral movement of the stabilizer frame,
   p. draft arms pivoted to said stabilizer arms and attached to said tractor frame forward of the rear axles, and
   q. connection means between said stabilizer frame and implement frame for
      i. drafting the implement frame from the stabilizer frame,
      ii. raising and lowering the stabilizer frame by the lift arms, and
      iii. preventing lateral movement of the implement frame relative to the stabilizer frame.
2. The invention as defined in claim 1 wherein said connection means includes
   r. links connected in
   s. bushings on the stabilizer frame.
3. The invention as defined in claim 2 further comprising:
   t. at least one coulter on said stabilizer frame.

* * * * *